(12) United States Patent
Byfeldt et al.

(10) Patent No.: US 7,384,515 B2
(45) Date of Patent: Jun. 10, 2008

(54) FOUR LAYER SEAM MULTI-AXIAL FABRIC (75) Inventors: Tobias Byfeldt, Göteborg (SE); Bjorn Rydin, Hörby (SE)

(73) Assignee: Albany International Corp., Albany, NY (US)

( * ) Notice: Subject to any disclaimer, the term of this patent is extended or adjusted under 35 U.S.C. 154(b) by 328 days.

(21) Appl. No.: 11/112,319

(22) Filed: Apr. 22, 2005

(65) Prior Publication Data

US 2006/0249064 A1    Nov. 9, 2006

(51) Int. Cl.
*D21F 7/10* (2006.01)
*D03D 3/04* (2006.01)

(52) U.S. Cl. .................. 162/358.2; 162/348; 162/900; 162/903; 162/904; 139/383 AA (58) Field of Classification Search ............... 162/116, 162/117, 358.1, 358.2, 306, 348, 900, 902–904; 28/110, 142; 428/57–60, 192, 193; 24/33 C, 24/33 P; 139/383 A, 425 A, 383 AA; 442/185, 442/186, 239–241, 268–271; 245/10
See application file for complete search history.

(56) References Cited

U.S. PATENT DOCUMENTS

| | | | |
|---|---|---|---|
| 4,865,083 A * | 9/1989 | Cunnane | 139/383 AA |
| 4,896,702 A | 1/1990 | Crook | |
| 5,360,656 A | 11/1994 | Rexfelt et al. | |
| 5,787,936 A * | 8/1998 | Snipes | 139/383 AA |
| 5,916,421 A | 6/1999 | Yook | |
| 5,939,176 A | 8/1999 | Yook | |
| 6,117,274 A | 9/2000 | Yook | |
| 6,302,155 B1 * | 10/2001 | Rydin | 139/383 AA |
| 6,773,553 B2 * | 8/2004 | Hyvonen et al. | 162/358.2 |
| 7,207,355 B2 * | 4/2007 | Lee | 139/383 A |

* cited by examiner

*Primary Examiner*—Eric Hug
(74) *Attorney, Agent, or Firm*—Frommer Lawrence & Haug LLP; Ronald R. Santucci (57) ABSTRACT

A fabric and a method of forming a fabric formed by the steps of providing an endless fabric having at least two layers of MD yarns, raveling CD yarns in an area of said endless fabric to be cut, cutting at least one layer of MD yarns at a first predetermined location, and cutting at least one layer of MD yarns at a second predetermined location. The method also includes steps of folding the endless fabric in half in the MD direction, placing the first and second predetermined locations proximally to one another, forming loops from at least one uncut layer of MD yarns when said fabric is folded, and seaming the loops to form an endless fabric.

20 Claims, 6 Drawing Sheets

FOUR LAYER SEAM MULTI-AXIAL FABRIC

BACKGROUND OF THE INVENTION

1. Field of the Invention

The present invention relates to papermaker's fabrics and in particular to fabrics which are seamed to provide for an endless fabric when installed on papermaking equipment.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

The present invention relates primarily to the fabrics used in the press section, generally known as press fabrics, but it may also find application in the fabrics used in the forming and dryer sections, as well as in those used as bases for polymer-coated paper industry process belts, such as, for example, long nip press belts.

Press fabrics play a critical role during the paper manufacturing process. One of their functions, as implied above, is to support and to carry the paper product being manufactured through the press nips.

Press fabrics also participate in the finishing of the surface of the paper sheet. That is, press fabrics are designed to have smooth surfaces and uniformly resilient structures, so that, in the course of passing through the press nips, a smooth, mark-free surface is imparted to the paper.

Perhaps most importantly, the press fabrics accept the large quantities of water extracted from the wet paper in the press nip. In order to fulfill this function, there literally must be space, commonly referred to as void volume, within the press fabric for the water to go, and the fabric must have adequate permeability to water for its entire useful life. Finally, press fabrics must be able to prevent the water accepted from the wet paper from returning to and rewetting the paper upon exit from the press nip.

Contemporary press fabrics are used in a wide variety of styles designed to meet the requirements of the paper machines on which they are installed for the paper grades being manufactured. Generally, they comprise a woven base fabric into which has been needled a batting of fine, nonwoven fibrous material. The base fabrics may be woven from monofilament, plied monofilament, multifilament or plied multifilament yarns, and may be single-layered, multi-layered or laminated. The yarns are typically extruded from any one of several synthetic polymeric resins, such as polyamide and polyester resins, used for this purpose by those of ordinary skill in the paper machine clothing arts.

Woven fabrics take many different forms. For example, they may be woven endless, or flat woven and subsequently rendered into endless form with a seam. Alternatively, they may be produced by a process commonly known as modified endless weaving, wherein the widthwise edges of the base fabric are provided with seaming loops using the machine-direction (MD) yarns thereof. In this process, the MD yarns weave continuously back and forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are seamed together. To facilitate seaming, many current fabrics have seaming loops on the crosswise edges of the two ends of the fabric. The seaming loops themselves are often formed by the machine-direction (MD) yarns of the fabric. The seam is typically formed by bringing the two ends of the press fabric together, by interdigitating the seaming loops at the two ends of the fabric, and by directing a so-called pin, or pintle, through the passage defined by the interdigitated seaming loops to lock the two ends of the fabric together.

Further, the woven base fabrics may be laminated by placing one base fabric within the endless loop formed by another, and by needling a staple fiber batting through both base fabrics to join them to one another. One or both woven base fabrics may be of the on-machine-seamable type.

In any event, the woven base fabrics are in the form of endless loops, or are seamable into such forms, having a specific length, measured longitudinally therearound, and a specific width, measured transversely thereacross. Because paper machine configurations vary widely, paper machine clothing manufacturers are required to produce press fabrics, and other paper machine clothing, to the dimensions required to fit particular positions in the paper machines of their customers. Needless to say, this requirement makes it difficult to streamline the manufacturing process, as each press fabric must typically be made to order.

Fabrics in modern papermaking machines may have a width of from 5 to over 33 feet, a length of from 40 to over 400 feet and weigh from approximately 100 to over 3,000 pounds. These fabrics wear out and require replacement. Replacement of fabrics often involves taking the machine out of service, removing the worn fabric, setting up to install a fabric and installing the new fabric. While many fabrics are endless, about half of those used in press sections of the paper machines today are on-machine-seamable. Some Paper Industry Process Belts (PIPBs) are contemplated to have an on machine seam capability, such as some transfer belts, known as Transbelt®. Installation of the fabric includes pulling the fabric body onto a machine and joining the fabric ends to form an endless belt.

In response to this need to produce press fabrics in a variety of lengths and widths more quickly and efficiently, press fabrics have been produced in recent years using a spiral winding technique disclosed in commonly assigned U.S. Pat. No. 5,360,656 to Rexfelt et al., the teachings of which are incorporated herein by reference.

U.S. Pat. No. 5,360,656 shows a press fabric comprising a base fabric having one or more layers of staple fiber material needled thereinto. The base fabric comprises at least one layer composed of a spirally wound strip of woven fabric having a width which is smaller than the width of the base fabric. The base fabric is endless in the longitudinal, or machine, direction. Lengthwise threads of the spirally wound strip make an angle with the longitudinal direction of the press fabric. The strip of woven fabric may be flat-woven on a loom which is narrower than those typically used in the production of paper machine clothing.

The base fabric comprises a plurality of spirally wound and joined turns of the relatively narrow woven fabric strip. The fabric strip is woven from lengthwise (warp) and crosswise (filling) yarns. Adjacent turns of the spirally wound fabric strip may be abutted against one another, and the spirally continuous seam so produced may be closed by sewing, stitching, melting, welding (e.g. ultrasonic) or gluing. Alternatively, adjacent longitudinal edge portions of adjoining spiral turns may be arranged overlappingly, so long as the edges have a reduced thickness, so as not to give rise to an increased thickness in the area of the overlap. Alternatively still, the spacing between lengthwise yarns may be increased at the edges of the strip, so that, when adjoining spiral turns are arranged overlappingly, there may be an unchanged spacing between lengthwise threads in the area of the overlap.

In any case, a base fabric, taking the form of an endless loop and having an inner surface, a longitudinal (machine) direction and a transverse (cross-machine) direction, is the result. The lateral edges of the base fabric are then trimmed to render them parallel to its longitudinal (machine) direction. The angle between the machine direction of the base fabric and the spirally continuous seam may be relatively small, that is, typically less than 10°. By the same token, the lengthwise (warp) yarns of the fabric strip make the same relatively small angle with the longitudinal (machine) direction of the base fabric. Similarly, the crosswise (filling) yarns of the fabric strip, being substantially perpendicular to the lengthwise (warp) yarns, make the same relatively small angle with the transverse (cross-machine) direction of the base fabric. Note, the crosswise and lengthwise yarns in the fabric strip may slip such that they are not always perpendicular to one another. In short, neither the lengthwise (warp) nor the crosswise (filling) yarns of the fabric strip align with the longitudinal (machine) or transverse (cross-machine) directions of the base fabric.

A press fabric having such a base fabric may be referred to as a multi-axial press fabric. Whereas the standard press fabrics of the prior art have three axes: one in the machine direction (MD), one in the cross-machine direction (CD), and one in the z-direction, which is through the thickness of the fabric, a multi-axial press fabric has not only these three axes, but also has at least two more axes defined by the directions of the yarn systems in its spirally wound layer or layers. Moreover, there are multiple flow paths in the z-direction of a multi-axial press fabric. As a consequence, a multi-axial press fabric has at least five axes. Because of its multi-axial structure, a multi-axial press fabric having more than one layer exhibits superior resistance to nesting and/or to collapse in response to compression in a press nip during the papermaking process as compared to one having base fabric layers whose yarn systems are parallel to one another.

Multi-axial press fabrics of the foregoing type had been produced only in endless form. As such, their use had been limited to press sections having cantilevered press rolls and other components, which permit an endless press fabric to be installed from the side of the press section. However, their relative ease of manufacture and superior resistance to compaction contributed to an increased interest and a growing need for a multi-axial press fabric which could be seamed into endless form during installation on a press section, thereby making such press fabric available for use on paper machines lacking cantilevered components. On-machine-seamable multi-axial press fabrics, developed to meet this need, are shown in commonly assigned U.S. Pat. Nos. 5,916,421; 5,939,176; and 6,117,274 to Yook, the teachings of which are incorporated herein by reference.

U.S. Pat. No. 5,916,421 shows an on-machine-seamable multi-axial press fabric for the press section of a paper machine made from a base fabric layer assembled by spirally winding a fabric strip in a plurality of contiguous turns, each of which abuts against and is attached to those adjacent thereto. The resulting endless base fabric layer is flattened to produce first and second plies joined to one another at folds at their widthwise edges. Crosswise yarns are removed from each turn of the fabric strip at folds at the widthwise edges to produce unbound sections of lengthwise yarns. A seaming element, having seaming loops along one of its widthwise edges, is disposed between the first and second fabric plies at each of the folds at the two widthwise edges of the flattened base fabric layer. The seaming loops extend outwardly between the unbound sections of the lengthwise yarns from between the first and second fabric plies. The first and second fabric plies are laminated to one another by needling staple fiber batting material therethrough. The press fabric is joined into endless form during installation on a paper machine by directing a pintle through the passage formed by the interdigitation of the seaming loops at the two widthwise edges.

U.S. Pat. No. 5,939,176 also shows an on-machine-seamable multi-axial press fabric. Again, the press fabric is made from a base fabric layer assembled by spirally winding a fabric strip in a plurality of contiguous turns, each of which abuts against and is attached to those adjacent thereto. The resulting endless fabric layer is flattened to produce a first and second fabric plies joined to one another at folds at their widthwise edges. Crosswise yarns are removed from each turn of the fabric strip at the folds at the widthwise edges to produce seaming loops. The first and second plies are laminated to one another by needling staple fiber batting material therethrough. The press fabric is joined into endless form during installation on a paper machine by directing a pintle through the passage formed by the interdigitation of the seaming loops at the two widthwise edges.

Finally, in U.S. Pat. No. 6,117,274, another on-machine-seamable multi-axial press fabric is shown. Again, the press fabric is made from a base fabric layer assembled by spirally winding a fabric strip in a plurality of contiguous turns, each of which abuts against and is attached to those adjacent thereto. The resulting endless fabric layer is flattened to produce a first and second fabric plies joined to one another at folds at their widthwise edges. Crosswise yarns are removed from each turn of the fabric strip at the folds at the widthwise edges to produce unbound sections of lengthwise yarns. Subsequently, an on-machine-seamable base fabric, having seaming loops along its widthwise edges, is disposed between the first and second fabric plies of the flattened base fabric layer. The seaming loops extend outwardly between the unbound sections of the lengthwise yarns from between the first and second fabric plies. The first fabric ply, the on-machine-seamable base fabric and the second fabric ply are laminated to one another by needling staple fiber batting material therethrough. The press fabric is joined into endless form during installation on a paper machine by directing a pintle through the passage formed by the interdigitation of the seaming loops at the two widthwise edges.

A seam is generally a critical part of a seamed fabric, since uniform paper quality, low marking and excellent runnability of the fabric require a seam which is as similar as possible to the rest of the fabric in respect of properties such as thickness, structure, strength, permeability etc. It is important that the seam region of any workable fabric behave under load and have the same permeability to water and to air as the rest of the fabric, thereby preventing periodic marking of the paper product being manufactured by the seam region. Despite the considerable technical obstacles presented by these seaming requirements, it is highly desirable to develop seamable fabrics, because of the comparative ease and safety with which they can be installed.

In some instances it is desirable or economic to form an endless fabric using the traditional process then fold it in half in order to make a fabric having one-half of the MD direction length of the original woven fabric. One reason for doing this is that it is easier and faster to weave a two-layer fabric than for example a four layer integrally woven fabric. By folding the original endless fabric in half in the MD direction, a two-layer fabric becomes a four-layer fabric. However, the folded fabric again requires a seaming arrangement that will not reduce the strength of the fabric or cause marking, whilst being relatively easy to install.

The present invention is directed at solving these problems.

SUMMARY OF THE INVENTION

It is an object of the present invention to provide a multi-layer papermaker's fabric used in a papermaking machine that exhibits improved seam characteristics.

It is a further object of the invention to provide an on machine seamable fabric formed by a spiral winding process, that minimizes the effects of the seam on the paper sheet.

It is a further object of the present invention to provide a seaming method for a fabric used in a papermaking machine that achieves the aforementioned objectives.

One aspect of the present invention is directed to a process for forming a multi-layer fabric including the steps of providing an endless fabric having at least two layers of MD yarns, raveling CD yarns in an area of the endless fabric to be cut, cutting at least one layer of MD yarns at a first predetermined location, and cutting at least one layer of MD yarns at a second predetermined location. The process also includes steps of folding the endless fabric in half in the MD direction, placing the first and second predetermined locations proximally to one another, forming loops from at least one uncut layer of MD yarns when the fabric is folded, and seaming the loops to form an endless fabric.

Another aspect of the present invention is a multi-layer fabric formed by the steps including, providing an endless fabric having at least two layers of MD yarns, raveling CD yarns in an area of the endless fabric to be cut, cutting at least one layer of MD yarns at a first predetermined location, cutting at least one layer of MD yarns at a second predetermined location, and folding the endless fabric in half placing the first and second predetermined locations proximally to one another. The multi-layer fabric is further formed by a step of seaming loops formed by the at least one uncut MD layer when the fabric is folded in half to form an endless fabric.

Yet a further aspect of the present invention is a multi-layer fabric including an endless base fabric having at least two layers of MD yarns, a raveled portion of CD yarns in a cut area of the endless fabric, a first cut portion of a first layer of the at least two layers of MD yarns, a second cut portion of a first layer of the at least two layers of MD yarns and a plurality of loops formed by the uncut layer of MD yarns. The multi-layer fabric also includes a seam connecting the loops when the endless fabric is folded upon itself in the MD direction.

In yet another aspect of the present invention the base fabric, or endless fabric having at least two layers of MD yarns is a multi-axial fabric formed by spiral winding. A spirally wound fabric is constructed from a fabric strip of yarn material having a width less than the width of the final base fabric. The fabric strip is characterized as a piece of material having a larger length than width. During manufacture of the base fabric, a fabric strip of yarn material is spirally wound, preferably over at least two rolls having parallel axes so as to form the spirally wound base fabric. The fabric strip is wound around the rollers with the edges of the strip arranged edge to edge or overlappingly, to achieve the desired width of the finished fabric.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

BRIEF DESCRIPTION OF THE DRAWINGS

Thus by the present invention, its objects and advantages will be realized, the description of which should be taken in conjunction with the drawings wherein.

DETAILED DESCRIPTION OF THE PREFERRED EMBODIMENTS

The present invention is directed to novel methods of seaming, which provide adequate seam strength with little or no effect on the structure at the seam compared to the body of fabric in paper machine clothing. Similar components are numbered the same throughout the figures.

Figure 1:
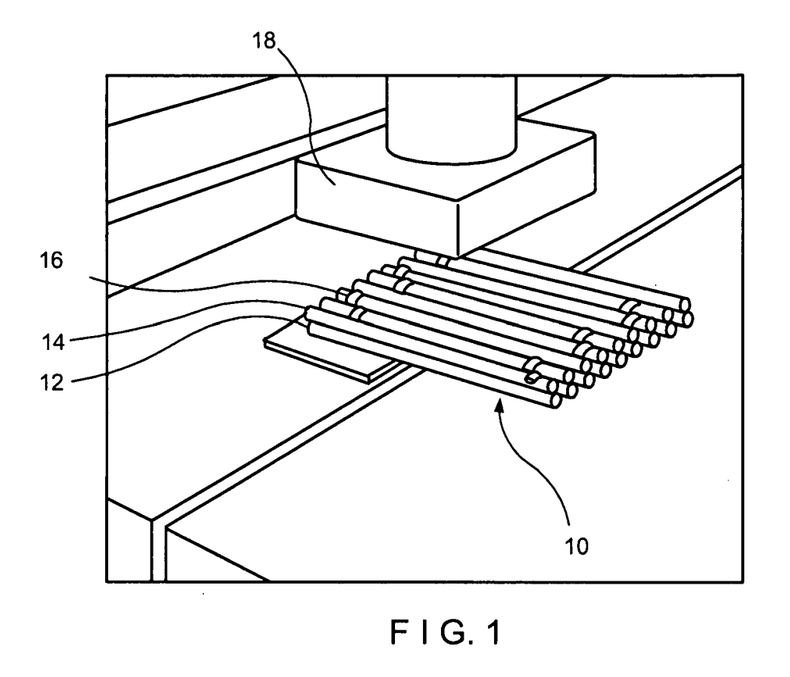
FIG. 1 is a plan view of a multi-layer fabric disposed in a cutting device, according to one aspect of the present invention.

With reference to the drawings, a process for forming an exemplary seam according to at least one embodiment of the present invention will be described. In FIG. 1 a two-layer fabric 10 is shown. The fabric 10 includes a first layer of MD yarns 12 and a second layer of MD yarns 14. The MD yarns extend continuously throughout the structure of the fabric 10. That is the fabric is formed continuous either by endless weaving or by method such as those described in the '656 patent where it is a multi-axial fabric. First and second layers 12 and 14 may be interwoven by at least one layer of CD yarns 16. As shown in FIG. 1, the CD yarns in the area to be acted upon by a cutting device 18, have already been removed or raveled.

In one embodiment of the present invention the cutting device 18 is used to cut at least one MD layer of yarns, in this example layer 14. As shown in FIG. 1, the cutting device 18 is a stamp, having a cutting surface (not shown), which cuts only one layer of the MD yarns when positioned over the yarns and pressure is applied. Other cutting devices are also considered within the scope of the present invention.

Figure 2:
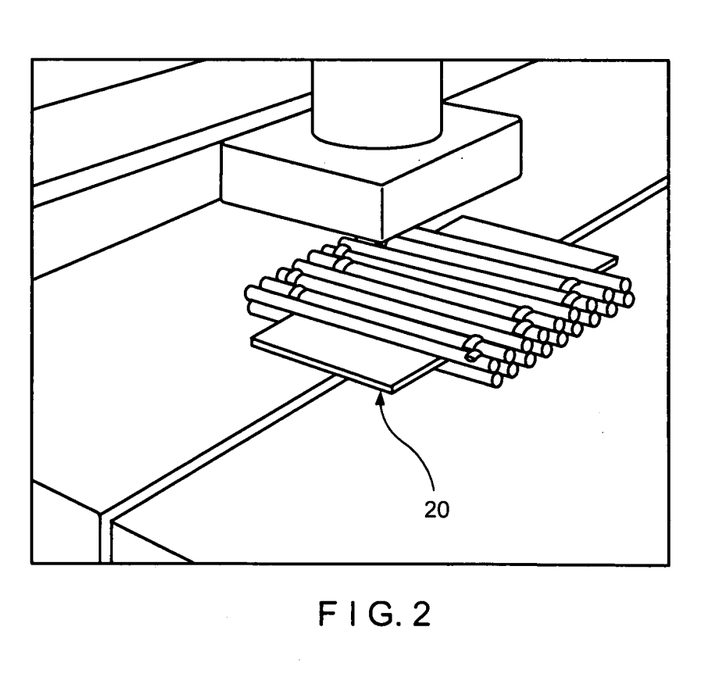
FIG. 2 is a plan view of a multi-layer fabric disposed in a cutting device with a shield disposed between the layers of the fabric, according to one aspect of the present invention.

As shown in FIG. 2, prior to application of the cutting device 18, and typically following raveling of a desired number of the CD yarns, a shield 20 may be inserted between the first and second MD yarns layers (12 and 14). The shield 20 prevents the undesirable cutting of the first MD layer 12. In some applications, the use of a shield will be unnecessary due to the precision of the cutting mechanism employed, the durability of the MD yarns, or other features of the fabric.

Figure 3:
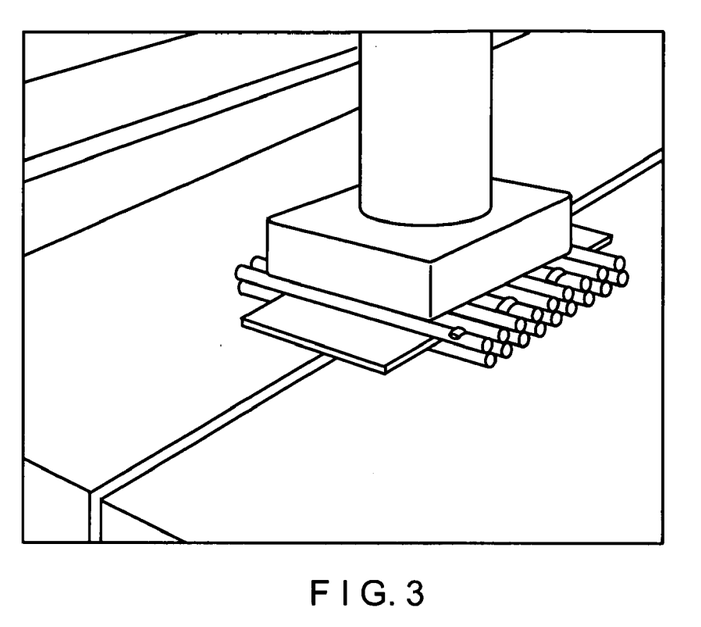
FIG. 3 is a plan view of a multi-layer fabric disposed in a cutting device, and in the act of cutting, according to one aspect of the present invention.
Figure 4:
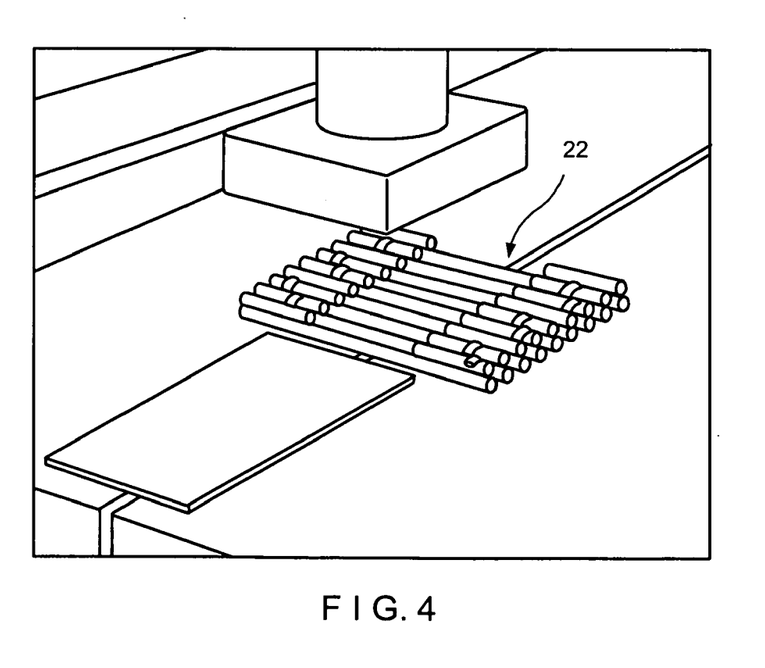
FIG. 4 is a plan view of multi-layer fabric disposed in a cutting device wherein the first layer has been cut according to one aspect of the present invention.
Figure 5:
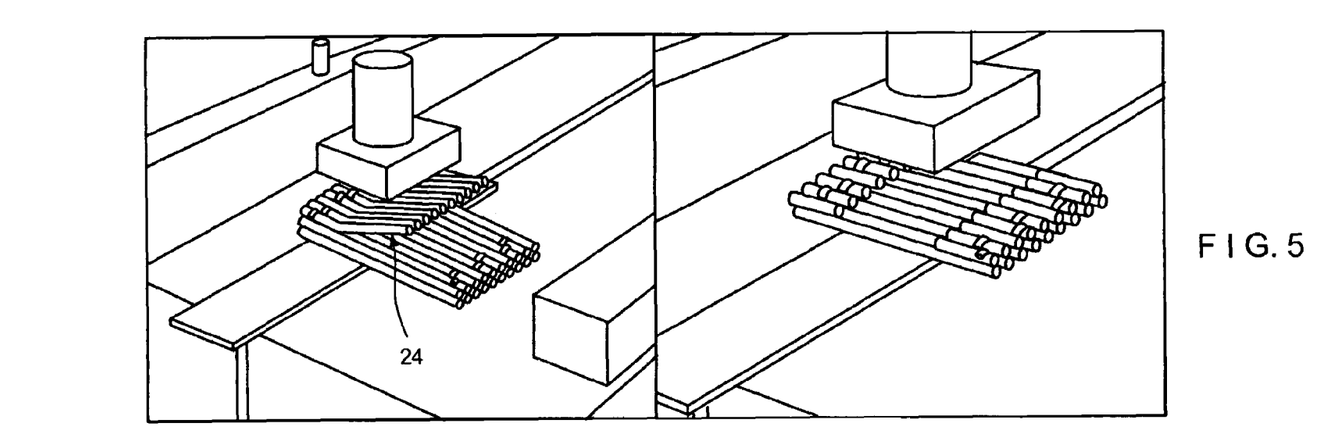
FIG. 5 is a plan view of a multi-layer fabric disposed in a cutting device, wherein the first layer has been cut according to one aspect of the present invention.

Once the shield 20 is in place, as shown in FIG. 3, the cutting device 18 can be implemented onto the fabric 10 to cut the second MD yarn layer 14. As shown in FIG. 4, the cutting device 18 can cut the MD layer 14 in two places so as to leave a gap 22 in the first MD layer. Alternatively, as shown in FIG. 5, the cutting device 20 may be employed to cut the MD layer 14 in a single place so as to leave a flap 24 of MD layer yarn. This process continues across the width of the fabric any number of times until a section of the MD yarns is cut out for the full width of the fabric. The number of repetitions is determined by the width of the cutter and the width of the fabric. Although in FIGS. 1-5 only a small portion of the fabric 10 is shown, this portion is representative of a larger fabric. The portion shown in the figures is limited for clarity of the cutting process.

Figure 6:
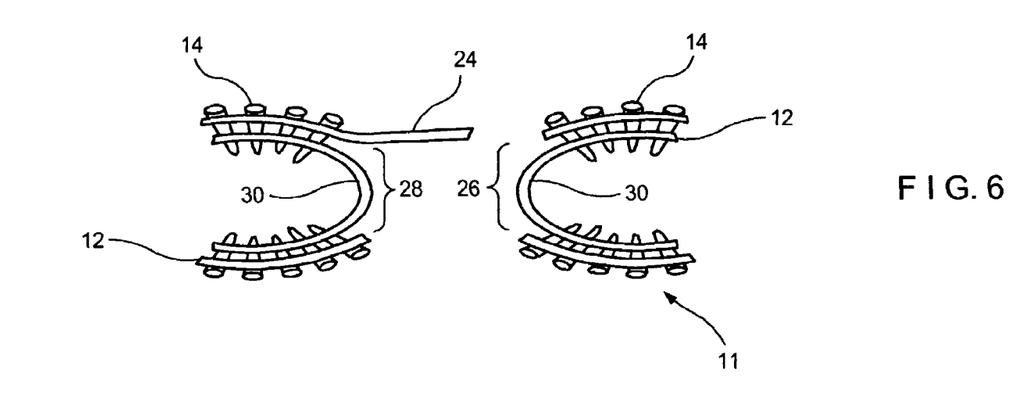
FIG. 6 is a cross-sectional view of an overlapping seam area of a multi-layer fabric, according to one aspect of the present invention.
Figure 7:
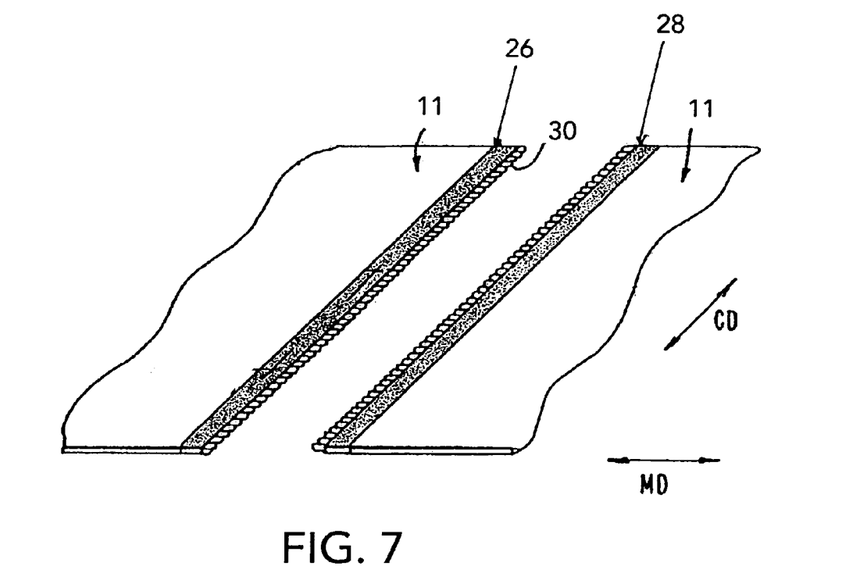
FIG. 7 is a portion of a multi-layer fabric formed in accordance with one embodiment of the present invention prior to seaming.
Figure 8:
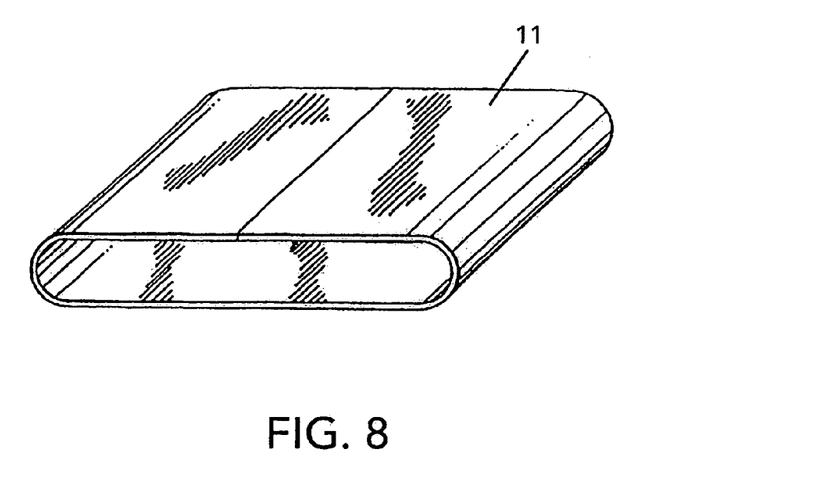
FIG. 8 is a seamed multi-layer fabric according to one aspect of the present invention.
Figure 9:
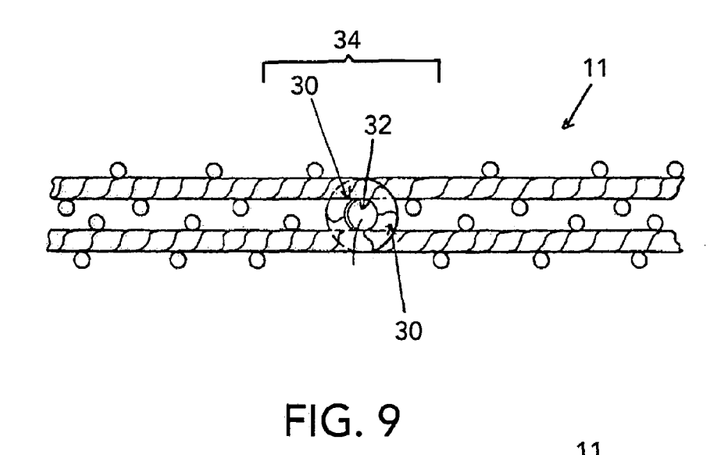
FIG. 9 is a side view of a seam in a multi-layer fabric according to one aspect of the present invention.

The cutting process is then repeated on a second section of the fabric which is located half the distance of the fabric length from the one just cut. Said another way, the cut out areas are 180° removed from one another along the continuous loop of the fabric. The two-layer fabric 10 is then folded upon itself forming a four-layer fabric 11. The uncut MD yarns 12, which, because they run continuous throughout the length of the fabric, now serve to form loops 30, as shown in FIGS. 6 and 7. When these loops 30 formed in the two cut areas 26 and 28 of the fabric 10 are brought together may be interdigitated and a pintle 32 placed there through as shown in FIG. 9, to form a endless seamed four-layer fabric as shown in FIG. 8.

FIG. 6 shows a two-layer fabric having been cut using both of the two cutting techniques discussed above and subsequently has been folded in half so to form a four-layer fabric 11. The cut portions 26 and 28 reveal uncut MD yarns 12 which form loops 30 which are brought together to form an on-machine seamable endless fabric having half the length of the original fabric but also having twice as many layers.

As shown by this example of the present invention, an endless two-layer fabric 10 may be cut in the manner shown in both FIGS. 4 and 5, and then folded in half to form an endless fabric 11 having four layers as shown in FIG. 6. The areas which have been cut 26 and 28, respectively of the fabric 10, when folded now include a layer of MD yarns 12 which are not cut. Upon folding, these MD yarns 12 form seaming loops 30. The seaming loops 30 are interdigitated with each other and a pintle 32 is inserted therethrough in the CD direction to form a seam 34. By use of a pin or pintle, the fabric 11 is rendered on-machine-seamable.

Figure 10:
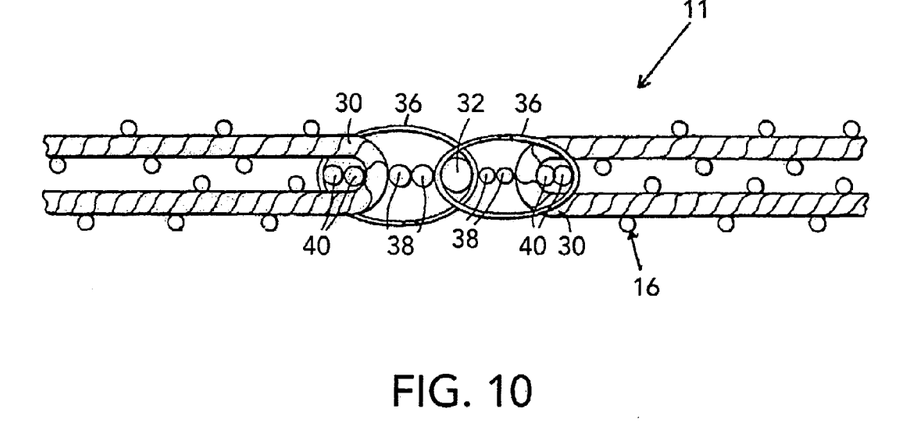
FIG. 10 is a side view of a seam in a multi-layer fabric according to a further aspect of the present invention.

In another embodiment as shown in FIG. 10, one or more seaming spirals 36 may be affixed to the loops 30 of the fabric 11 to be joined. That is the spirals 36 are inserted into the loops 30 formed of the MD yarns 12. The spirals 36 are then interdigitated and one or more pintles 32 inserted there through. The seaming spirals 36 are monofilament spirals, preferably of extruded polyamide resin. The monofilament diameter may be, for example, 0.40 mm or 0.50 mm. During the installation of fabric 11 on a paper machine, seaming spirals 36, being of monofilament, may be readily interdigitated with one another and joined to one another by directing pintle 32 through the passage defined by the interdigitated spirals. Stuffer yarns 38 may be inserted within the seaming spirals 36 to ensure that the seam region has the same characteristics as the rest of the fabric 11. In addition connecting yarns 40 may be used in the seaming process. The connecting yarns 40 and stuffer yarns 38 may be yarns of the same types used as the CD yarns 16 of the fabric 11. Pintle 32 may be a single strand of monofilament, multiple strands of monofilament untwisted about one another, or plied, twisted, braided or knitted together, or one or more strands of any of the plied/twisted yarns.

Further, the ends of the fabric may be seamed by other seaming means known to those of skill in the art.

In one embodiment of the present invention this structure is as an on-machine-seamable fabric for use in the press section of a papermaking process. In such an embodiment batt fibers are applied to either one or both the top (sheet side) and bottom (machine side) surfaces of the multi-layer fabric.

Once formed into an endless fabric by the seam 34, the flap 24 of MD yarns 14 helps prevent marking and increases pressure uniformity over the seam, and provides an anchoring point for the layers such as batt which may be needled into the fabric as desired.

Figure 11:
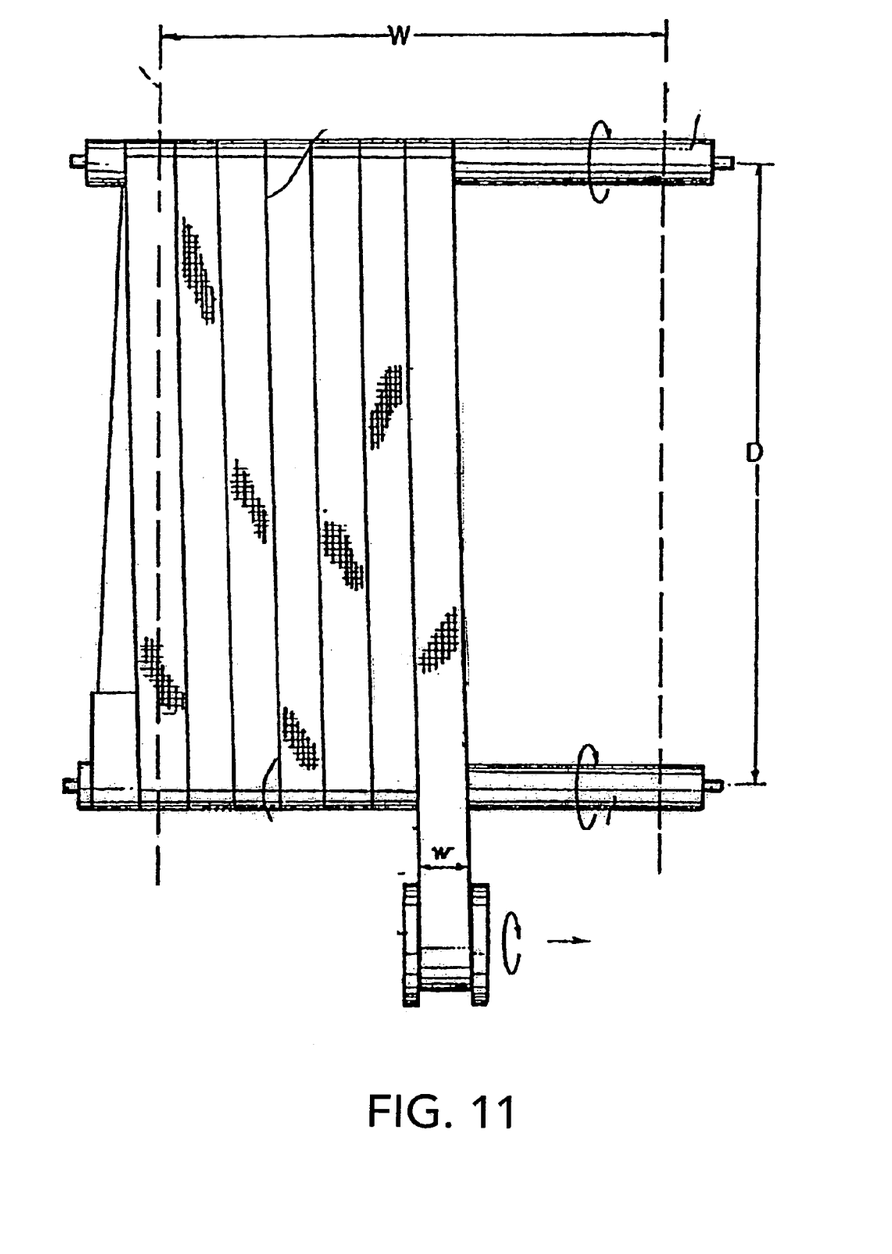
FIG. 11 is a top view of a method of manufacturing a multi-axial fabric.

In another preferred embodiment the two-layer fabric is formed by the process described in the '656 patent and comprises, for example, a two layer weave or two single layers and is a multi-axial fabric. The process of forming the fabric described in the '656 patent is shown generally in FIG. 11 and is known as spiral winding. It will be apparent to those of skill in the art that because the fabric is spirally wound the MD yarns and CD yarns do not align when the fabric is folded in half as described above. Alignment of MD yarns, removal of specified portions of CD yarns, interdigitating of loops formed by MD yarns, and seaming of such a fabric is described in detail in commonly assigned U.S. Pat. No. 5,939,176 to Yook, the entirety of which is incorporated herein by reference.

Thus by the present invention its objects and advantages are realized, and although preferred embodiments have been disclosed and described in detail herein, its scope and objects should not be limited thereby; rather its scope should be determined by that of the appended claims.

What is claimed is:

1. A process for forming a multi-layer fabric comprising the steps of:
    providing an endless fabric having at least two layers of MD yarns;
    raveling CD yarns in an area of said endless fabric to be cut;
    cutting at least one layer of MD yarns at a first predetermined location;
    cutting at least one layer of MD yarns at a second predetermined location;
    folding the endless fabric in half in the MD direction;
    placing the first and second predetermined locations proximally to one another;
    forming seaming loops from the at least one uncut layer of MD yarns when said fabric is folded; and
    seaming the loops to form an endless fabric.

2. The process of claim 1, wherein at least one of said cutting steps form a flap of uncut MD yarns on at least one of said predetermined locations.

3. The process of claim 1, wherein at least one of said cutting steps cuts the MD yarn layer in two places, and removes a section of the MD yarns from the fabric.

4. The process of claim 1 further comprising a step of interdigitating the loops formed in the at least one uncut MD layer.

5. The process of claim 4, further comprising a step of inserting a pintle into the interdigitated loops.

6. The process of claim 1, wherein the endless fabric is a multi-axial fabric formed by spiral winding.

7. The process of claim 1, further comprising a step of inserting at least one spiral seaming element into the loops formed by the at least one uncut MD layer.

8. The process of claim 1, further comprising a step of inserting a shield device between a first and a second layers of the at least two uncut MD yarn layers.

9. The process of claim 8, wherein the shield facilitates the cutting of at least one layer of MD yarns and prevents the cutting of a second layer.

10. The process of claim 1, wherein the endless fabric is formed by endless weaving.

11. The process of claim 1, wherein the endless fabric if formed by spiral winding.

12. A multi-layer fabric formed by the steps comprising:
    providing an endless fabric having at least two layers of MD yarns;
    raveling CD yarns in an area of said endless fabric to be cut;
    cutting at least one layer of MD yarns at a first predetermined location;
    cutting at least one layer of MD yarns at a second predetermined location;
    folding the endless fabric in half placing the first and second predetermined locations proximally to one another; and
    seaming loops formed by the at least one uncut MD layer when said fabric is folded in half to form an endless fabric.

13. A multi-layer fabric comprising:
    an endless base fabric having at least two layers of MD yarns;
    a raveled portion of CD yarns in a cut area of said endless fabric;
    a first cut portion of a first layer of said at least two layers of MD yarns;
    a second cut portion of a first layer of said at least two layers of MD yarns;
    a plurality of loops formed by the uncut layer of MD yarns; and
    a seam connecting the loops when said endless fabric is folded upon itself in the MD direction.

14. The multi-layer fabric of claim 13, wherein at least one of said first and second cut portions includes a flap of uncut MD yarns.

15. The multi-layer fabric of claim 13, wherein at least one of said first and second cut portions has a section of the MD yarns removed from the fabric.

16. The multi-layer fabric of claim 13, wherein the loops formed by the uncut MD layer are interdigitated.

17. The multi-layer fabric of claim 16, further comprising a pintle inserted into the interdigitated loops form a seam.

18. The multi-layer fabric of claim 13, wherein fabric is a multi-axial fabric formed by spiral winding which is folded upon itself.

19. The multi-layer fabric of claim 13, wherein the endless fabric is formed by endless weaving.

20. The multi-layer fabric of claim 13, further comprising at least one spiral-seaming element inserted into the loops formed by the at least one uncut MD layer.

* * * * *